United States Patent [19]
Ohta

[11] 4,078,461
[45] Mar. 14, 1978

[54] TRIMMING PRESS HAVING DIE MOVABLE TO INACTIVE POSITION TO FACILITATE SCRAP REMOVAL

[75] Inventor: Hiroyuki Ohta, Yokohama, Japan
[73] Assignee: Mitsui Mining & Smelting Co., Ltd., Tokyo, Japan
[21] Appl. No.: 778,989
[22] Filed: Mar. 18, 1977
[51] Int. Cl.² .................. B26F 1/02; B26D 7/18
[52] U.S. Cl. ........................ 83/111; 83/150; 83/157; 83/160; 83/564; 83/914
[58] Field of Search ............... 83/82, 112, 124, 132, 83/133, 135, 111, 150, 157, 160, 167, 914, 159, 563, 564

[56] References Cited
U.S. PATENT DOCUMENTS

| 1,013,339 | 1/1912 | Verdin et al. | 83/150 X |
| 2,201,582 | 5/1940 | Jerichow | 83/564 |

*Primary Examiner*—J. M. Meister
*Attorney, Agent, or Firm*—Flynn & Frishauf

[57] ABSTRACT

A press apparatus which comprises a press body formed of a bed and a ram, fitted with an upper die; an auxiliary bed disposed adjacent to the bed and designed to be rotated at a prescribed angle thereto; a rotation mechanism for rotating the auxiliary bed; a bolster reciprocating along both beds; a shifting mechanism for effecting the reciprocation of the bolster; a lock mechanism designed normally to keep both beds engaged with each other, thereby preventing the rotation of the auxiliary bed, when the bolster is shifted to that prescribed point on the auxiliary bed at which the rotation axes of both bolster and auxiliary bed are aligned with each other, to disengage both beds from each other, thereby allowing the rotation of the auxiliary bed and bolster for complete removal of a press-worked product, for example a trimmed product, or scrap (including runner refuse) attached to a lower die and a forwarding mechanism designed to send forth a press-worked product taken off by a product-pushing cylinder to the outlet of the press apparatus.

4 Claims, 11 Drawing Figures

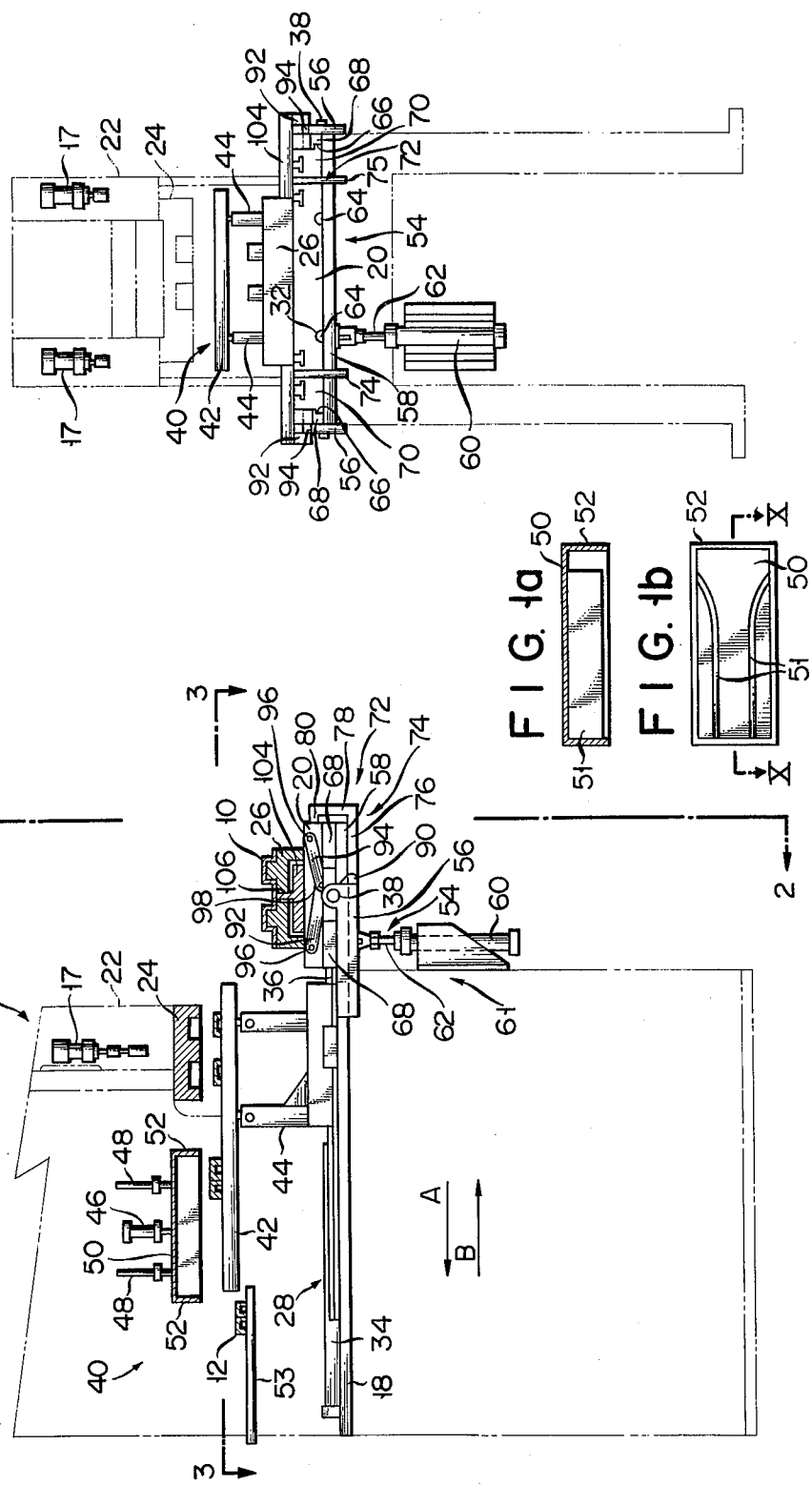

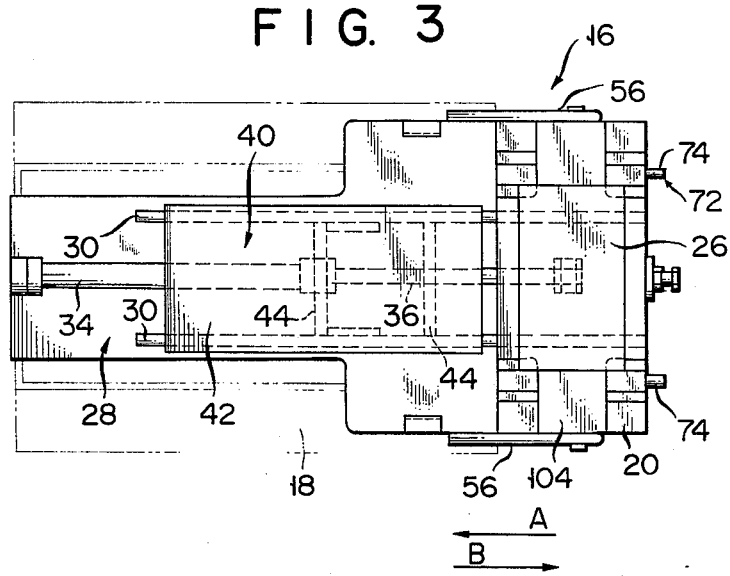
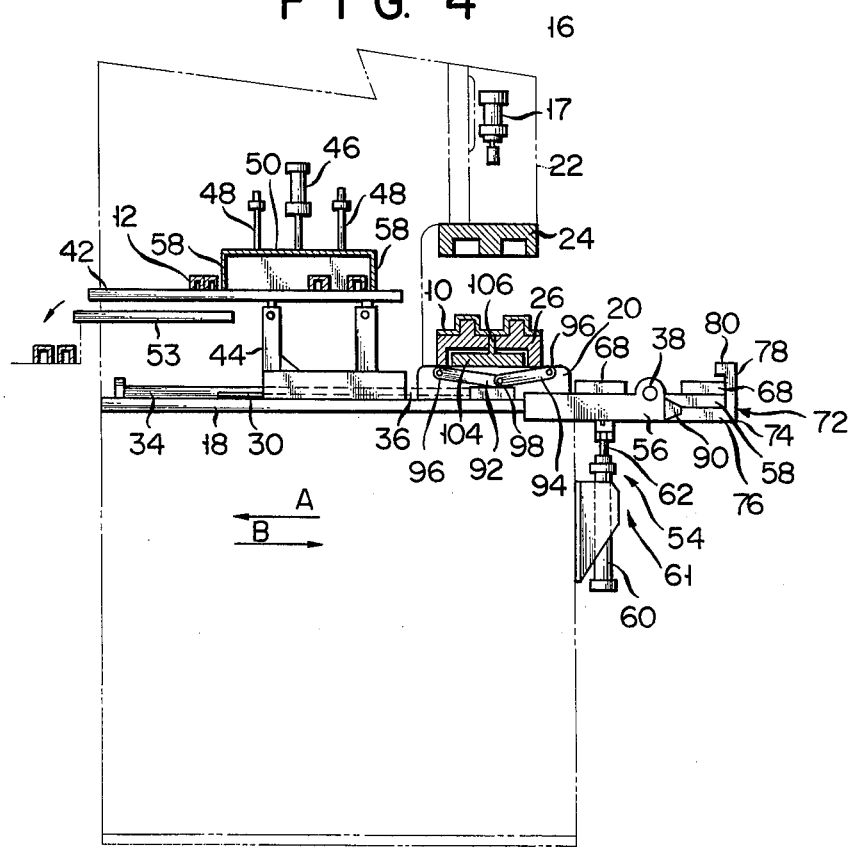

4,078,461

TRIMMING PRESS HAVING DIE MOVABLE TO INACTIVE POSITION TO FACILITATE SCRAP REMOVAL

BACKGROUND OF THE INVENTION

This invention relates to a press apparatus capable of automatically removing a press-worked product or scrap unavoidably attached to the lower die when press working is carried out by press work.

Recent improved automation of a press apparatus has attained the prominent effect of increasing production, saving personnel cost and elevating the precision of product. Particularly where a product is manufactured by a through for integrated process with a press apparatus and other devices applied together, then the automation of the press apparatus is indispensable.

The known automated press apparatuses include a type, in which an auxiliary bed rotated by a rotating mechanism is disposed adjacent to one end of the bed of a press body; a bolster securely holding a lower die is so mounted as to reciprocate along the press body bed and auxiliary bed; the lower die, on which scrap is unavoidably deposited during press working is shifted on to the auxiliary bed together with the bolster; and the bolster is rotated together with the auxiliary bed to remove scrap remaining on the lower die.

However, the above-mentioned type of the prior art press apparatus had the drawbacks that where the rotation mechanism was put into operation before the bolster was shifted to a prescribed point on the auxiliary bed, then nonalignment occurred between the rotation axes of both bolster and auxiliary bed; consequently an unduly large stress was applied to a drive cylinder and piston rod for shifting the bolster, possibly with the resultant damage of said cylinder and piston rod; and if scrap is not removed from the lower die in good timing, even in case the bolster, together with the auxiliary bed, was properly rotated, then the subsequent pressing cycle was undertaken with scrap still remaining on the lower die, probably leading to the damage of a press-worked product or the press apparatus itself.

SUMMARY OF THE INVENTION

It is accordingly an object of this invention to provide a press apparatus comprising a lock mechanism which, when the bolster is shifted on to the auxiliary bed but not to a point at which the rotation axes of both bolster and auxiliary bed an aligned with each other, is designed to effect engagement between the body of the press apparatus and auxiliary bed thereby preventing the rotation of the auxiliary bed, and, only when the rotation axes of the bolster and auxiliary bed are aligned with each other, releases said engagement to allow the rotation of the auxiliary bed.

Another object of the invention is to provide a press apparatus comprising a discharging mechanism, which, when the auxiliary bed is rotated with the bolster, is designed automatically to remove a press-worked product or scrap attached to the lower die fitted to the bolster.

To attain the above-mentioned objects, this invention provides a press apparatus which comprises a press body formed of a bed and a ram whose underside is fitted with an upper die designed to carry out press work in cooperation with the lower die; an auxiliary bed disposed adjacent to one end of the press body bed and rotated by a pivotally supported member fitted to the press body bed; a rotation mechanism for rotating the auxiliary bed to admit of the removal of a press-worked product or scrap attached to the lower die during press work; a bolster which is designed to reciprocate along the surfaces of the press body bed and auxiliary bed and whose upper side is fitted with the lower die; a shifting mechanism for effecting the reciprocation of the bolster; and a lock mechanism, which is fitted to the auxiliary bed and provided with movable engagement projections for normally effecting engagement between the auxiliary bed and press body bed, thereby preventing the rotation of the auxiliary bed and in consequence the bolster, and, when the bolster is shifted on to the auxiliary bed to a point at which the rotation axes of the bolster and auxiliary bed are aligned with each other, releases said engagement by moving the engagement projections, thereby allowing the rotation of the auxiliary bed and bolster.

With the press apparatus of this invention arranged as described above, the rotation of the auxiliary bed and bolster is carried out only when the bolster occupies the aforesaid prescribed position, thereby preventing the failure of the press apparatus which might otherwise arise from an undue stress applied to the shifting mechanism for effecting the reciprocation of the bolster, and moreover a press-worked product or scrap unavoidably attached to the lower die during press work can be easily taken off by proper means.

A press apparatus according to a preferred embodiment of this invention for the comprises an outward protrudable member which is fitted with a plurality of erected push pins. Operation of said protrudable member can easily and reliably remove a press worked product or scrap from the lower die.

If, in this case, the aforesaid pivotally support member comprises integrally formed immovable projections for pushing the above-mentioned protrudable member where the bolster, together with the auxiliary bed, is rotated through a prescribed angle, then a press-worked product or scrap can be automatically taken out by rotation of the bolster and auxiliary bed, thus offering great convenience.

A press apparatus according to another preferred embodiment of this invention further comprises a carrier which reciprotates with the bolster while holding a press-worked product or scrap taken off the upper die; and a plurality of vertically set forwarding plates automatically moved in a vertical direction relative to the carrier in good timing and designed stepwise to push forward the press-worked product or scrap only in a prescribed direction, that is, toward the outlet of the press apparatus. This embodiment can also automatically discharge the press-worked product or runner refuse taken off the upper die.

BRIEF DESCRIPTION OF THE DRAWINGS

FIG. 1 is a front view of a press apparatus embodying this invention;

FIG. 1a is a side view of a case having forwarding plates and open at the bottom which belongs to a product-forwarding mechanism;

FIG. 1b is a sectional view on line X—X of the case of FIG. 1a;

FIG. 2 is a side elevational view of the press apparatus on line 2—2 of FIG. 1;

FIG. 3 is a plan view of the press apparatus on line 3—3 of FIG. 1;

FIG. 4 is a front view of the press apparatus when the bolster of FIG. 1 is shifted in a direction of A;

DETAILED DESCRIPTION OF THE PREFERRED EMBODIMENTS

Figure 5:
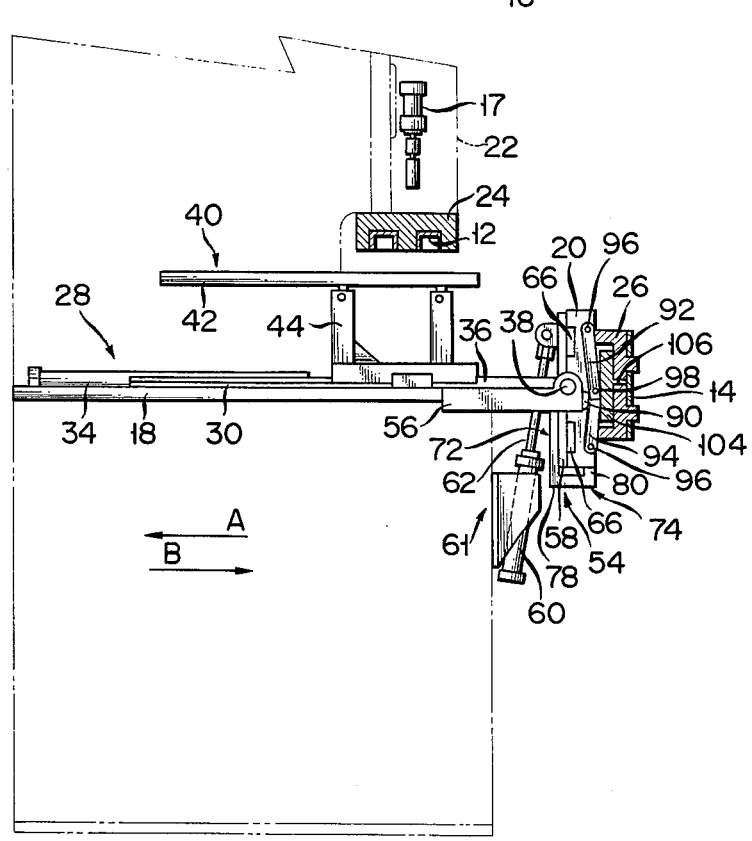
FIG. 5 is a front view of the press apparatus when the bolster of FIG. 1 is shifted in a direction of B.

There will now be described by reference to the appended drawings a press apparatus according to an embodiment of this invention. FIGS. 1 to 5 collectively represents the press apparatus. This press apparatus automatically trims a product 10 (FIG. 1) molded, for example, by a die-casting machine (not shown) and automatically removes a press-worked product or a trimmed molded product 12 (FIG. 5) and scrap or runner refuse 14 (FIG. 5). The body 16 of the press apparatus is left open on the right and left sides of FIG. 1. A horizontally movable bolster 20 is mounted on a bed 18 of the press body 16. An upper die 24 is fitted to the lower end of a ram 22 of the press apparatus. A lower die 26 is securely set on the bolster 20 by proper fixing means (not shown). As shown in FIG. 1, a product 10 molded by a die-casting machine (not shown) is located on, for example, the lower die 26. When this lower die 26 is brought, as shown in FIG. 4, under the upper die 24 by the shifting of the bolster 20, the product 10 is trimmed by the vertical movement of the ram 22.

A shifting mechanism 28 for shifting the bolster 20 is fitted to the surface of the bed 18 of the press body 16. The shifting mechanism 28 comprises a pair of guide rails 30, 30 formed of a pair of hexagonal polished steel rods (FIG. 3). The guide rails 30, 30 are fitted into long grooves 32, 32 (FIG. 2) formed in the underside of the bolster 20 to guide the bolster 20 horizontally in a direction of A or B shown in FIG. 1. The shifting mechanism 28 comprises a drive cylinder 34 for shifting the bolster 20 mounted on the press body bed 18. The drive cylinder 34 shifts the bolster 20 in the direction of A or B of FIG. 1 by means of a piston rod 36. The bolster 20 is supported at the right end of the piston rod 36 so as to rotate about a pivotal shaft (not shown) disposed perpendicular to the surface of the drawing of FIG. 1.

Where the molded product 10 is trimmed, using the upper and lower die 24, 26, then trimmed molded product 12 or runner refuse 14 (FIG. 5) is generally attached to the upper die 24, and the runner refuse 14 or trimmed molded product 12 is attached to the lower die 26. Whether the trimmed molded product 12 or runner refuse 14 is left on the upper die 24 or the lower die 26 depends on the kind of a trimmed molded product or the process of press work. Since the above-mentioned event does not affect the essential object of this invention, the following description is given on the assumption that, as shown in FIG. 5 the trimmed molded product 12 is attached to the upper die 24 and the runner refuse 14 is retained on the lower die 26. However, FIG. 5 omits the later described trimmed molded product-forwarding plates 52 belonging to the trimmed molded product-forwarding mechanism 40 and the associated parts thereof and a trimmed molded product-receiving plate 53, all of which are unrelated to the description given by reference to FIG. 5.

Referential numeral 40 of FIG. 1 denotes a forwarding mechanism for pushing forward to the outside of the press apparatus a trimmed molded product 12 taken off the upper die 24 by a push cylinder 17. A carrier-supporting member 44 included in the forwarding mechanism 40 and designed to support a carrier 42 in a substantially horizontal position in fixed to the bolster 20, and, when driven by a drive cylinder 34, is shifted in the direction of A or B indicated in FIG. 1 along the guide rails 30.

The carrier 42 is a channel-shaped member which extends uniformly in a horizontal direction and is open at the left end and on the upper side.

Provided above the carrier 42 is a forwarding unit included in the trimmed molded product-forwarding mechanism 40, fitted to the press body 16 and designed to move forward the trimmed molded product 12 placed on the carrier 42 in the direction of A of FIG. 1. This forwarding unit comprises an air cylinder 46; a case 50 open at the bottom which moves vertically when driven by a piston rod cooperating with the air cylinder 46; and guide member 48, 48 for guiding the vertical movement of the case 50. The case 50 is provided with forwarding plates 52, 52 extending downward from the periphery of the horizontal member of the case 50.

As shown in FIG. 1, a trimmed molded product-receiving plate 53 is almost horizontally fixed to the press body 16 on the left side of the carrier 42 in a slightly lower position than the carrier 42 and in the proximity thereof. The trimmed molded product 12 falling off the upper die 24 is progressively shifted to the left by the horizontal reciprocation of the carrier 42 as well as by the action of the aforesaid forwarding plates 52, 52 which are brought downward in good timing to prevent the trimmed molded product 12 from being sent back to the right together with the reciprocating carrier 42 and, when the trimmed molded product 12 is going to more to the left, are pulled up to allow the leftward shifting of the trimmed molded product 12. The trimmed molded product 12 which has fallen on the receiving plate 53 is further forwarded to the left.

The above-mentioned trimmed molded product-forwarding mechanism 40 occurs a trimmed molded product to be gently moved to the left while sliding along the surfaces of the carrier 42 shifted in a substantially horizontal direction and receiving plate 53 and further transferred to any other device (not shown), for example, a machining tool or packing device. Therefore, the press apparatus of this invention has advantages over the prior art press apparatus provided with a forwarding mechanism designed to transfer a trimmed molded product by letting it slide down an inclined chute. The reason is that molded product trimmed by the press apparatus of this invention are less subject to mechanical shocks while being forwarded to the outlet of the press apparatus and consequently trimmed products actually damaged by mechanical shocks arise in an appreciably smaller number than in the past.

FIGS. 1a, and 1b jointly show a modification of the case 50 included in the trimmed molded product-forwarding mechanism 40 and formed of a horizontal member 49 and forwarding plates 52. FIG. 1a is a lateral view of the case 50 taken in the same direction as in FIG. 1. FIG. 1a is a sectional view of the case 50 on line X—X of FIG. 1b. The horizontal member 49 of the case 50 is fitted with a pair of guide plates 51 which project downward toward the carrier 42 and are interspaced at a progressively smaller distance in the direction in which a trimmed molded product is forwarded, that is, toward the outlet of the press apparatus. The case 50 is made several fold as long as the stroke of the drive cylinder 34. A plurality of press-trimmed products are received between the guide plates 51 to the full length of their interspace. When the carrier 42 is shifted to the right, the received press-trimmed products are pushed through the narrow portion of the interspace of the guide plates 51 while being aligned in the same direction, regardless of the position taken by the products when initially entering the case 50. The trimmed molded products are forced out of the case 50 one after another, starting with one occupying the extreme left end position and are let to fall on the receiving plate 53 in succession. The automatic fall of the trimmed molded product occupying the extreme left end position on the receiving plate 53 is affected, because, when the carrier 42 is fully shifted to the right, then the left end of said carrier 42 passes to the right beyond the left end of the case 50, thus providing a free space between the left ends of both carrier 42 and case 50. As mentioned above, the trimmed molded products have their positions aligned in the same direction which being forced through the guide plates 51, eliminating the necessity of manually aligning the positions of the trimmed molded products taken out of the case 50, and in consequence offering great convenience in further transferring the products to the succeeding work site, for example, a machining tool or packing device. Obviously, the curved form of the guide plates 51, 51 and the length in which they intend downward can be suitably chosen according to the shape of trimmed molded products being handled and the posture to which they are to be aligned.

The ram 22 is provided with a pair of push cylinders 17, 17 (FIGS. 1 and 2) which let a trimmed molded product 12 attached to the upper die 24 to fall on the carrier 42.

The right end portion (FIG. 1) of the press body 16 is fitted with a mechanism 54 for removing runner refuse attached (in this case) to the lower die 26 during press trimming. The runner refuse-removing mechanism 54 comprises a pair of pivotally supported members 56, 56 (FIGS. 1, 2, 3, 8 and 9) disposed on both sides of the right end of the press body bed 18 and space from each other in a direction perpendicular to the surface of the drawing of FIG. 1. Between said pivotally supported member 56, the auxiliary bed (FIGS. 1, 8 and 9) whose surface is normally made flush with that of the press body bed 18 is rotatably supported by a pivotal shaft 38 fitted to said rotatably supported members 56, 56. The underside of the auxiliary bed 58 is fitted with a rotation mechanism 61 which comprises a piston rod 62 of a bolster-rotating cylinder 60, with the upper end of said piston rod 62 made rotatable relative to the auxiliary bed 58. The cylinder 60 itself is fitted to the press body 16 so as to swing about an axis (not shown) parallel with the pivotal shaft 38. When the piston rod 62 is pulled out of the cylinder 60 by its action, then the auxiliary bed 58 is rotated clockwise about the pivotal shaft 38. When the piston rod 62 is retracted into the cylinder 60, then the auxiliary bed 58 is rotated counterclockwise. The auxiliary bed 58 comprises a pair of auxiliary rails 64, 64 (FIG. 2) projectively formed along the extension line of the guide rails 30, 30 of the shifting mechanism 28 in order to guide the bolster 20 as to the auxiliary bed 58. When the bolster 20 rotatably fitted to the right end portion of the piston 36 of the drive cylinder 34 is shifted on to the auxiliary bed 58 by the action of the drive cylinder 34, the rotation axis of the bolster 20 is aligned with the pivotal shaft 38.

Both lateral sides of the upper portion of the auxiliary bed 58 are integrally provided with a pair of guides 68, 68 having engagement grooves 66, 66. The bolster 20 is provided with projections 70, 70 corresponding to said guides 68, 68. Since the engagement projections are slidably fitted into the engagement grooves 66, 66 the bolster 20, when shifted horizontally, is prevented from swinging in a direction perpendicular to the drawing of FIG. 1.

Figure 6:
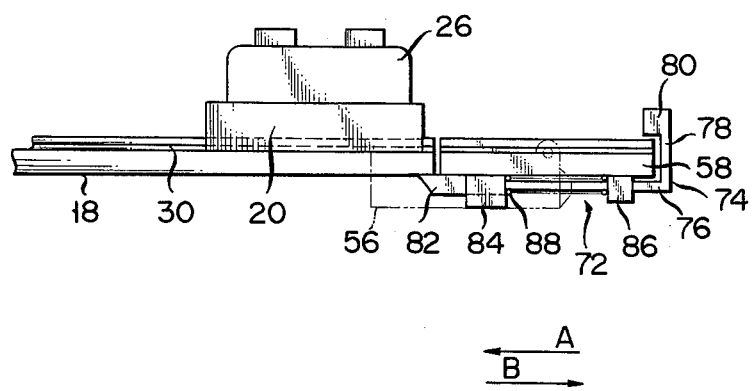
FIG. 6 is a front view of the lock mechanism of FIG. 1 when set in a locked position.
Figure 7:
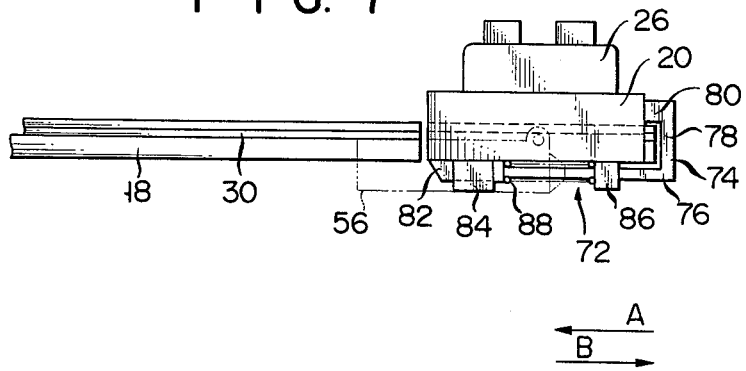
FIG. 7 is a front view of the lock mechanism of FIG. 1 when unlocked.

Both lateral sides of the auxiliary bed 58 are fitted with a pair of lock mechanisms 72, 72 (FIGS. 1, 6 and 7). The lock machanism 72 comprises a lock rod 74. This lock rod 74 is formed of a base section 76 exending along the underside of the auxiliary bed 58, a rising section 78 which begins to rise on the right side of the auxiliary bed 58, and a projection 80 extending from the upper end of the rising section 78 toward the bolster 20.

That end of the base section 76 of the lock rod 74 which faces the press body bed 18 is provided with an engagement projection 82 (FIGS. 6 and 7) having a larger cross section than the base section 76. The engagement projection 82 and base section 76 can slide along the guide rail 64, while being guided by the corresponding fitting members 84, 86. A compression coil spring 88 is stretched between the fitting member 86 and a stepped portion which defines a boundary between the engagement projection 82 and base section 76. The lock rod 74 is so urged by the compression coil spring 88 to be pushed toward the press body bed 18 (FIG. 6). When the lock rod 74 is pushed toward the press body bed 18, then the engagement projection 82 is engaged with the underside of the press body 18 to lock said bed 18, thereby preventing the auxiliary bed 58 to be rotated clockwise.

Where, however, the bolster 20 is shifted to the right side of FIG. 1 to strike the projection 80, then the lock rod 74 is moved to the right against the force of the compression coil spring 88, thereby withdrawing the engagement projection 82 to the right and unlocking the press body bed 18 to allow the rotation of the auxiliary bed 58. A pair of support members 56, 56 are each provided with an immovable projection 90 protruding to the right (FIG. 1 indicates only one of said projection 90). Each lateral side of the bolster 20 is fitted with a pair of push members 92, 94, in which the member 94 is located at the position facing the immovable projection 90. One end of each of the push members 92, 94 is rotatably fitted to the bolster 20 by a pin 26. A pin 98 is loosely inserted through the holes (not shown) bored in the other side mutually overlapping end portions of the push members 92, 94. One of these holes is made elongate to allow the push members 92, 94 to be rotated through a prescribed angle about the corresponding pins 96, 96.

Figure 8:
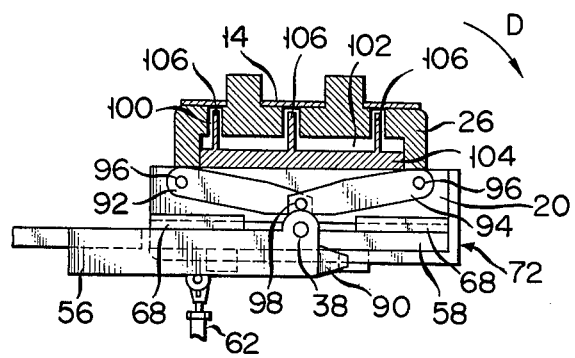
FIG. 8 shows a scrap-removing mechanism when set in an inoperative position.

As shown in FIG. 8, the lower die 26 is bored with a plurality of vertically penetrating runner refuse-pushing holes 100. A runner refuse-pushing unit 104 on which a plurality of push pins 106 are erected so as to be inserted into said holes 100 is received in a space 102 provided between the lower die 26 and bolster 20. Where the runner refuse-pushing unit 104 is moved upward toward the upper die 24, the push pins 106 protrude from the surface of the lower die 26 through the holes 100. Where the bolster 20 is rotated clockwise together with the auxiliary bed 58, then the other end portion of the push member 94 is forced into the lower die 26 by the immovable projection 90. The push member 92, 94 cooperate to push the runner refuse-pushing unit 104 into the lower die. As the result, the push pins 106 of said pushing unit 104 protrude from the surface of the lower die 26 to remove the runner refuse 14 attached to the lower die 26.

There will now be described the operation of the press apparatus of this invention constructed as described above. A molded product 10 delivered from a die-casting machine (not shown) is placed on the lower die 26 positioned on the right side of the upper die 24 in an obliquely downward direction (FIG. 1). When the piston rod 36 is drawn into the drive cylinder 34, then the carrier support 44 connected to the piston rod 36 and bolster 20 are shifted along the guide rails 30, 30 to the left, that is, in the direction of A to a position shown in FIG. 4. When the carrier support 44 is fully shifted in the direction of A, then the forwarding plates 52, 52 guided by the two guide members 48 are pulled downward by the air cylinder 46 and brought to rest in contact with the carrier 42. A trimmed molded product 12 is placed on the carrier 42 to lie between the forwarding plates 52, 52. A preceding trimmed molded product 12 already fallen on to the product-receiving plate 53 is through operation of the carrier 42 and forwarding plates 52, 52 pushed to the left along the surface of the receiving plate 53 by the left end portion of the carrier 42 to be delivered to any other device (not shown) for handling said product, for example, a product-storing device.

Figure 9:
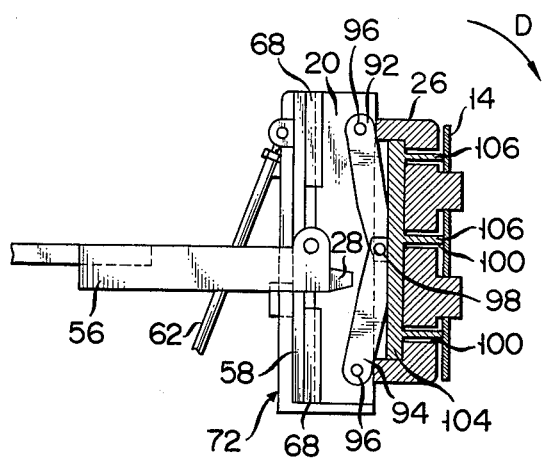
FIG. 9 indicates the scrap-removing mechanism of FIG. 8 when put into operation.

When the bolster 20 is shifted in the direction of A to a point indicated in FIG. 4, then the lower die 26 fixed to the bolster 20 takes a position facing the upper die 24 fitted to the ram 22. When, at this time, the upper die 24 falls on the lower die 26, then the molded product 10 placed on the lower die 26 is trimmed. When the ram 22 is pulled up, the trimmed molded product 12 is attached to the inner wall of the upper die 24, and runner refuse 14 is left on the lower die 26. After the ram 22 is lifted, the piston rod 36 protrudes out of the drive cylinder 34, causing the carrier support 44 and the bolster 20 securely holding the lower die 26 to be shifted in the direction of B. At this time, the trimmed molded product 12 now lying on the carrier 42 and obstructed by the forwarding plates 52 cannot be sent back in the direction of B, but is shifted to the left to the extent of the shifting distance of the carrier 42. When shifted in the direction of B to take the position shown in FIG. 1, the carrier 42 is set apart from the upper die 24. When, therefore, the trimmed molded product-pushing cylinder 17 is driven, a trimmed molded product 12 attached to the inner wall of the upper lid 28 can fall on to the carrier 42 without being obstructed. At this time, the forwarding plates 52, 52 are pulled upward by the air cylinder 46. Therefore, a fresh trimmed molded product 12 fallen on the carrier 42 can be shifted in the direction of A without being obstructed by the forwarding plates 52, 52, when the carrier 42 is moved in said direction.

Where the carrier 42 is shifted in the direction of B by the drive cylinder 34, then the bolster 20 is also moved in the same direction to be transferred from the guide rails 30, 30 of the press body bed 18 on to the auxiliary rails 64, 64 provided on the auxiliary bed 58, thereby pushing the projection 80, 80 of the lock rods 74, 74 constituting the lock mechanism 72 to the right. Accordingly, the projections 80, 80 and in consequence the lock rods 74, 74 and engagement projections 82, 82 are shifted in the direction of B against the force of the compression coil springs 88. The engagement projections 82, 82 which have prevented the rotation of the auxiliary bed 58 up to this time by abutment against the underside of the press body bed 18 are retracted to a point at which said engagement projections 82, 82 are released from the underside of the press body bed 18, thereby admitting of the rotation of the auxiliary bed 58 and consequently the operation of the runner refuse-removing mechanism 54. At this time, the bolster-rotating cylinder 60 is driven as shown in FIGS. 5 and 9, causing the piston rod 62 to protrude upward and in consequence the bolster 20 to be rotated about the same axis as the pivotal shaft of the auxiliary bed 58 in a direction of D shown in FIGS. 8 and 9. At this time, the immovable projections 90, 90 formed on the support members 56, 56 thrust the push members 92, 94 in the direction of B (FIGS. 5 and 9), thereby causing the pushing unit 104 and in consequence the push pins 106 to protrude to the right. As the result, the push pins 106 strike against the runner refuse 14 deposited on the lower die 26 for removal of said runner refuse 14. The removed runner refuse 14 is let to fall into a proper receptacle (not shown).

After removal of the runner refuse 14, the bolster-rotating cylinder 60 is driven to rotate the auxiliary bed 58 in the opposite direction to that of D. As the result, the bolster 20 and lower die 26 regain a horizontal position. When the bolster 20 is brought back to a horizontal position, the bolster 20 and carrier 42 are shifted in the direction of A by the drive cylinder 34. The lock rods 74, 74 are shifted in the direction of A by the compression coil springs 88, 88. As the result, the engagement projections 82, 82 are again pressed against the underside of the press body bed 18 to prevent the rotation of the auxiliary bed 58, thus locking the auxiliary bed 58 and runner refuse-removing mechanism 54. When the bolster 20 and carrier 42 are further moved in the direction of A, the trimmed molded products 12 which have fallen on the carrier 42 are taken out of the press apparatus one after another. Successive operation of the bolster-rotating cylinder 60, drive cylinder 34, ram 22 and molded product-pushing cylinder 17 by means of, for example, a limit switch (not shown) effects automatic trimming. Therefore, combination of the press apparatus of this invention with a die-casting machine and a device for delivering a product 10 molded by the die-casting machine to said press apparatus can automatically manufacture a trimmed molded product 12 by an integrated process. With the press apparatus of this invention, the rotation of the bolster 20, and auxiliary bed 58, and the operation of the runner refuse-removing mechanism 54 can be undertaken only when the bolster 20 is moved to a prescribed point on the auxiliary bed by the lock mechanism 72. Accordingly, this invention has the advantages that the bolster is saved from rotation to an improper point, preventing the occurrence of failure of the associated mechanisms and the insufficient removal of runner refuse 14; the immovable projections 90, 90 provided on the pivotally supported members 56, 56 push the pushing unit 104 by means of the push members 92, 94 when the bolster 20 is rotated, thereby easily and reliably removing runner refuse 14 from the lower die 26; and in consequence the succeeding press work is prevented from being undesirably continued with part of runner refuse 14 still attached to the inner wall of the lower die 26.

What is claimed is:

1. A press apparatus comprising a press body having a bed, a lower die and a ram whose underside is fitted with an upper die for carrying out press work in cooperation with the lower die; an auxiliary bed which is disposed adjacent to one end of the press body bed; means for supporting said auxiliary bed relative to said press body bed, said support means including pivotally supported members fitted to the press body bed so as to be rotated with the surface of the press body bed; a rotation mechanism for rotating the auxiliary bed, thereby removing a press-worked product or scrap attached to the lower die during press work; a bolster whose upper side is fitted with the lower die and which is reciprocable along the press body bed and auxiliary bed; a shifting mechanism for reciprocating the bolster; and a lock mechanism which comprises an engagement projection fitted to the auxiliary bed and normally engaging the auxiliary bed with the press body bed, thereby preventing the rotation of the auxiliary bed and in consequence the bolster, and, when the bolster is shifted to that prescribed point on the auxiliary bed at which the rotation axes of the bolster and auxiliary bed are aligned with each other, moves the engagement projections to release said engagement, thereby permitting rotation of the auxiliary bed and bolster.

2. The press apparatus according to claim 1, which comprises a pushing unit provided with a plurality of vertically set push pins protruding upward from the inner wall of the lower die when it is rotated, thereby removing the press worked product or scrap attached to the lower die.

3. The press apparatus according to claim 2, wherein the pivotally supported members are provided with projections for pushing the push members when the bolster is rotated with the auxiliary bed through a prescribed angle.

4. The press apparatus according to claim 1, which further comprises a carrier reciprocating with the bolster while holding a press-worked product or scrap taken off the upper die; and press-worked product-forwarding plates which are vertically movable relative to the carrier, and, when pulled upward, allows press-worked product or scrap to be forwarded with the carrier, and, when brought downward, obstructs the movement of the trimmed molded product or runner refuse with the carrier, thereby causing the press-worked product to slide along the carrier only in a prescribed direction.

* * * * *